United States Patent [19]

Rottler et al.

[11] Patent Number: 4,792,265
[45] Date of Patent: Dec. 20, 1988

[54] ENGINE BORING AND SURFACING MACHINE

[75] Inventors: Donald B. Rottler; David Engnell, both of County of King, Wash.

[73] Assignee: Rottler Manufacturing Company, Kent, Wash.

[21] Appl. No.: 4,809

[22] Filed: Jan. 9, 1987

Related U.S. Application Data

[63] Continuation of Ser. No. 622,074, Jun. 19, 1984, abandoned.

[51] Int. Cl.[4] .............................................. B23B 47/00
[52] U.S. Cl. ..................................... 408/237; 408/236; 408/709; 409/241; 409/904
[58] Field of Search ............. 408/88, 709, 239, 239 A, 408/235, 234, 236, 54, 72 R, 75, 26 R, 237; 409/233, 235, 237, 238, 239, 241, 209; 29/568

[56] References Cited

U.S. PATENT DOCUMENTS

| | | | |
|---|---|---|---|
| 1,440,602 | 1/1923 | Hook | 409/241 |
| 3,260,136 | 7/1966 | Rottler | 408/88 |
| 3,484,065 | 12/1969 | Walter | 409/241 |
| 3,665,805 | 5/1972 | Wolf | 409/190 |
| 3,680,437 | 8/1972 | Cravens, Jr. | 409/233 |
| 3,955,471 | 5/1976 | Frazier | 409/233 |
| 4,127,942 | 12/1978 | Flaten | 408/75 |
| 4,190,948 | 3/1980 | Kielma | 29/568 |
| 4,234,275 | 11/1978 | Clement | 408/709 |
| 4,620,347 | 11/1986 | Stark et al. | 29/568 |

FOREIGN PATENT DOCUMENTS 2127332  4/1984  United Kingdom ................ 409/191

Primary Examiner—E. R. Kazenske
Assistant Examiner—James L. Wolfe
Attorney, Agent, or Firm—Seed and Berry

[57] ABSTRACT

A surfacing and boring machine for reconditioning engine blocks has a front stationary work table, a traveling column on rails provided by an elongated rigid base, a power head unit on the column adjustable in an air float condition to move an overhanging spindle forwardly and rearwardly, and mechanisms in the power head unit to independently move a spindle carrier vertically and to rotate the spindle at selected speeds. Clamping devices are provided to independently clamp the power head unit to the traveling column and the column to the base rails. A quick-change unit is located in the spindle for the tools.

10 Claims, 6 Drawing Sheets

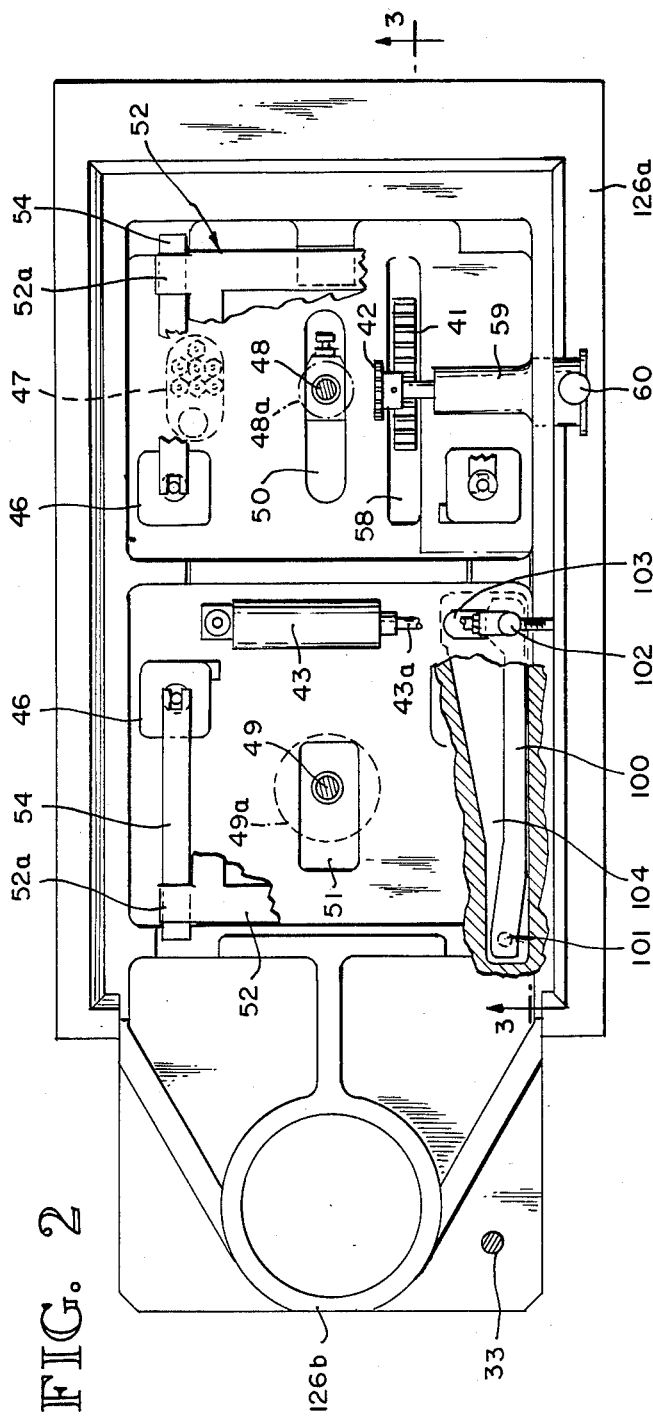
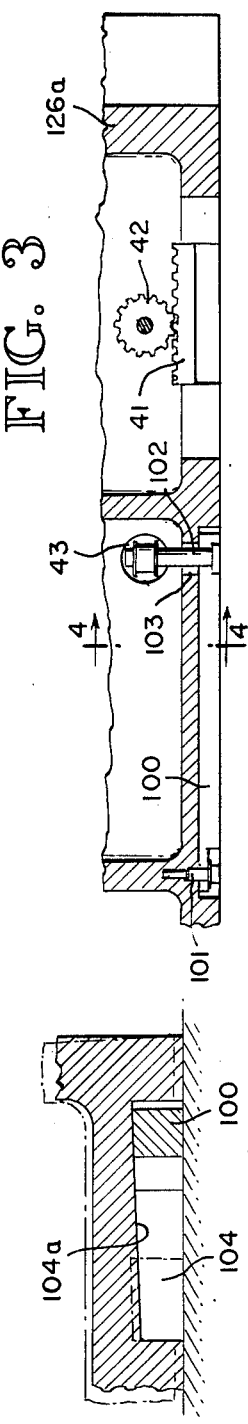
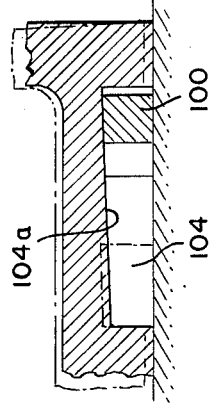
FIG. 2
FIG. 3
FIG. 4

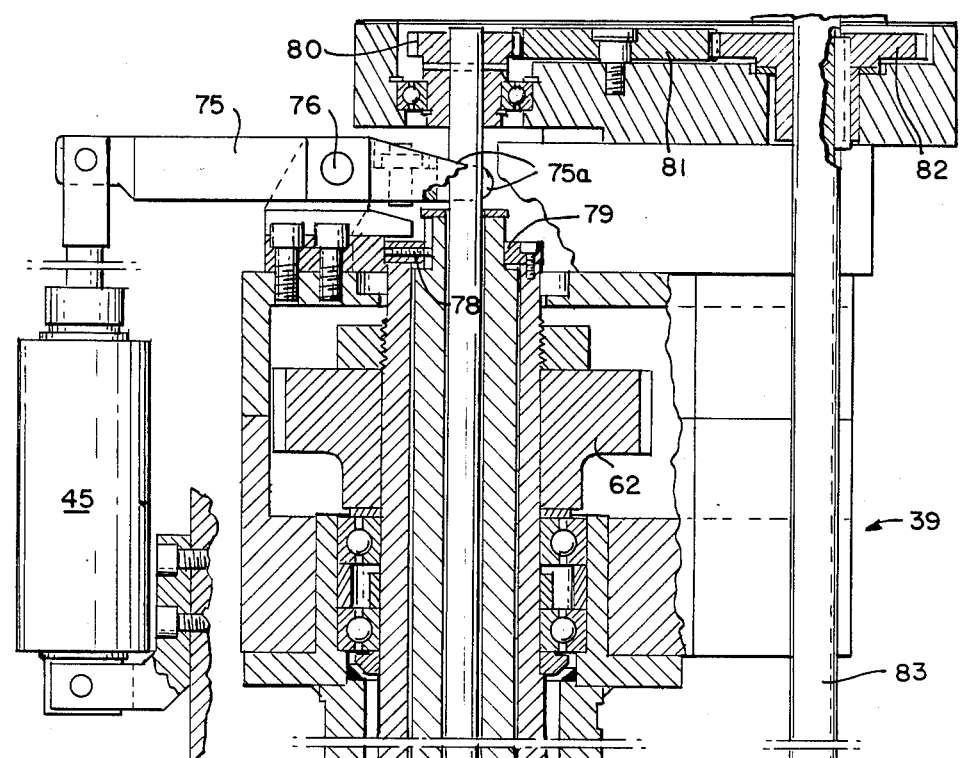
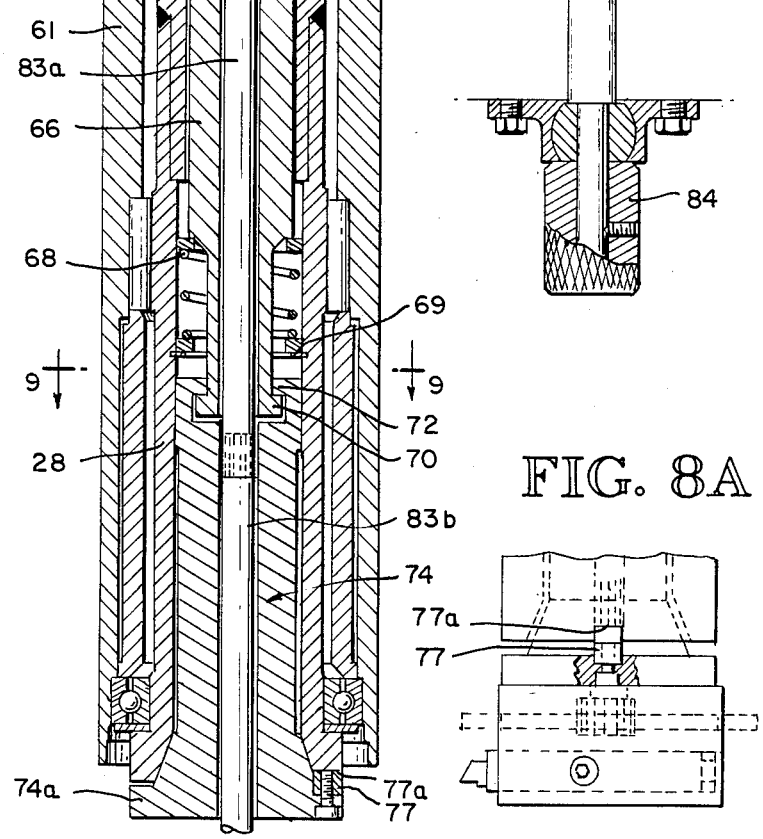
FIG. 8
FIG. 8A

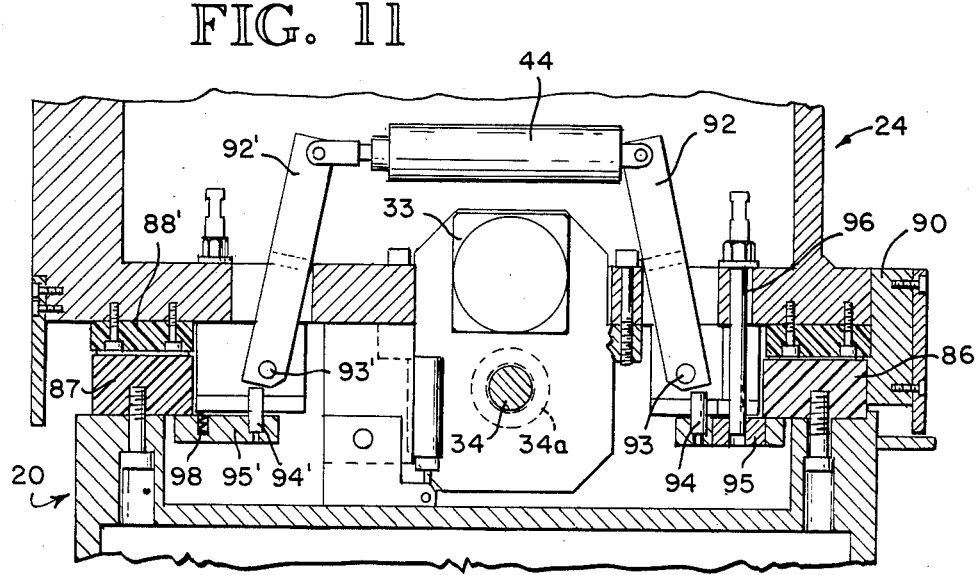
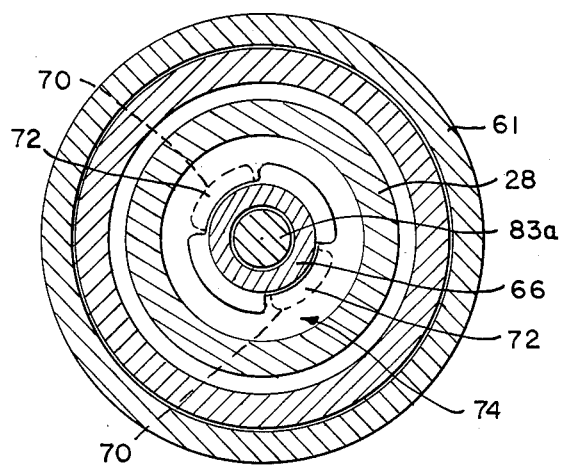
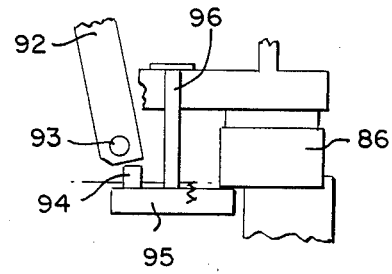
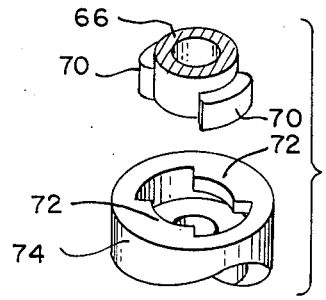

ENGINE BORING AND SURFACING MACHINE

This application is a continuation of U.S. patent application Ser. No. 622,074, filed June 19, 1984, now abandoned.

TECHNICAL FIELD

The present invention relates to a boring and surfacing machine for resurfacing the heads and reboring the cylinders of used engine blocks, and more particularly to such a machine in which the block is kept stationary during the surfacing and boring operations rather than being held on a traveling table.

Table sag is a common problem on traveling table type boring and surfacing machines, particularly when used to rebore and resurface large diesel engine blocks. On such machines commonly the work table is adjusted on both horizontal axes to accomplish centering of each cylinder bore relative to the spindle axis in preparation for the boring operation. This complicates the table sag problem.

It is important for operational speed to make the boring tool centering operation and the changing from surfacing head to boring head as easy and quick as possible, and to have easy access for spindle positioning, measuring, set-up, loading and unloading of the work piece. For maximized resurfacing speed it is preferred to use a multi-armed fly cutter for the surfacing operation, but this requires that the spindle axis be tilted slightly from the vertical so that as one arm of the cutter is performing a milling sweep of the block, the other arm or arms cannot drag across the resurfaced face of the block.

With the foregoing in mind, the present invention aims to provide an improved reliable boring and surfacing machine for working on a wide range of engine block sizes and types in which the block is held stationary during the surfacing and boring of each bank of cylinders to eliminate table sag problems, and yet obtain superior accuracy, performance, speed and ease of operation with a minimum of operator time.

In carrying out the objects of the invention there is provided a traveling column carrying a power head unit which can be readily horizontally adjusted on the column toward and away from the work piece while lifted by an air float and can be wedged to tilt the power head unit in the direction of column travel when a surfacing cutter is to be used. A quick-change mechanism is provided including a draw tube acting on a tool adapter within the spindle which is spring-urged upwardly into adapter locking position. The spindle depends from a carrier which has an air-powered tool release to overcome the spring in the quick-change mechanism when the tool is to be changed. Conventional boring tools and cutters can be used by attachment to the lower end of the adapter. The spindle carrier rides up and down with a nut on a powered ball-type screw and slides along a power shaft interconnected in the carrier with the spindle and having a variable speed drive. The spindle carrier also slides along a manually operated centering finger adjusting shaft which interconnects in the carrier with a centering finger shaft extending along the axis of the spindle to connect with the centering finger mechanism of the boring tool when it is used. The traveling column travels horizontally on precision rails by way of a powered nut on a stationary ball-type screw. Provision is made for independently air clamping the column to the rails and the power head unit to the traveling column. Controls for the unit are provided in a position adjustable console.

BRIEF DESCRIPTION OF THE DRAWINGS

FIG. 2 is a top plan view of the bottom portion of the power head partly assembled;

FIG. 3 is a fragmentary vertical cross-sectional view taken as indicated by line 3—3 in FIG. 2;

FIG. 4 is an enlarged fragmentary vertical sectional view taken on line 4—4 of FIG. 3;

FIG. 8 is a fragmentary vertical sectional view along the X-axis and centrally through the spindle and spindle carrier;

FIG. 8A is a detail view showing the keying of the tool adapter to the lower end of the spindle;

FIG. 9 is an enlarged horizontal sectional view taken on line 9—9 of FIG. 8;

FIG. 10 is a detail fragmentary perspective showing the lower end of the draw tube and the upper end of the tool adapter in position to be engaged with one another;

FIG. 11 is a fragmentary transverse vertical sectional view through the base section and the lower portion of the traveling column showing the clamping mechanism for the column in disengaged position; and FIGS. 12 and 13 are schematics showing the clamping mechanism for the column in disengaged and clamping positions, respectively.

BEST MODE FOR CARRYING OUT THE INVENTION

Figure 1:
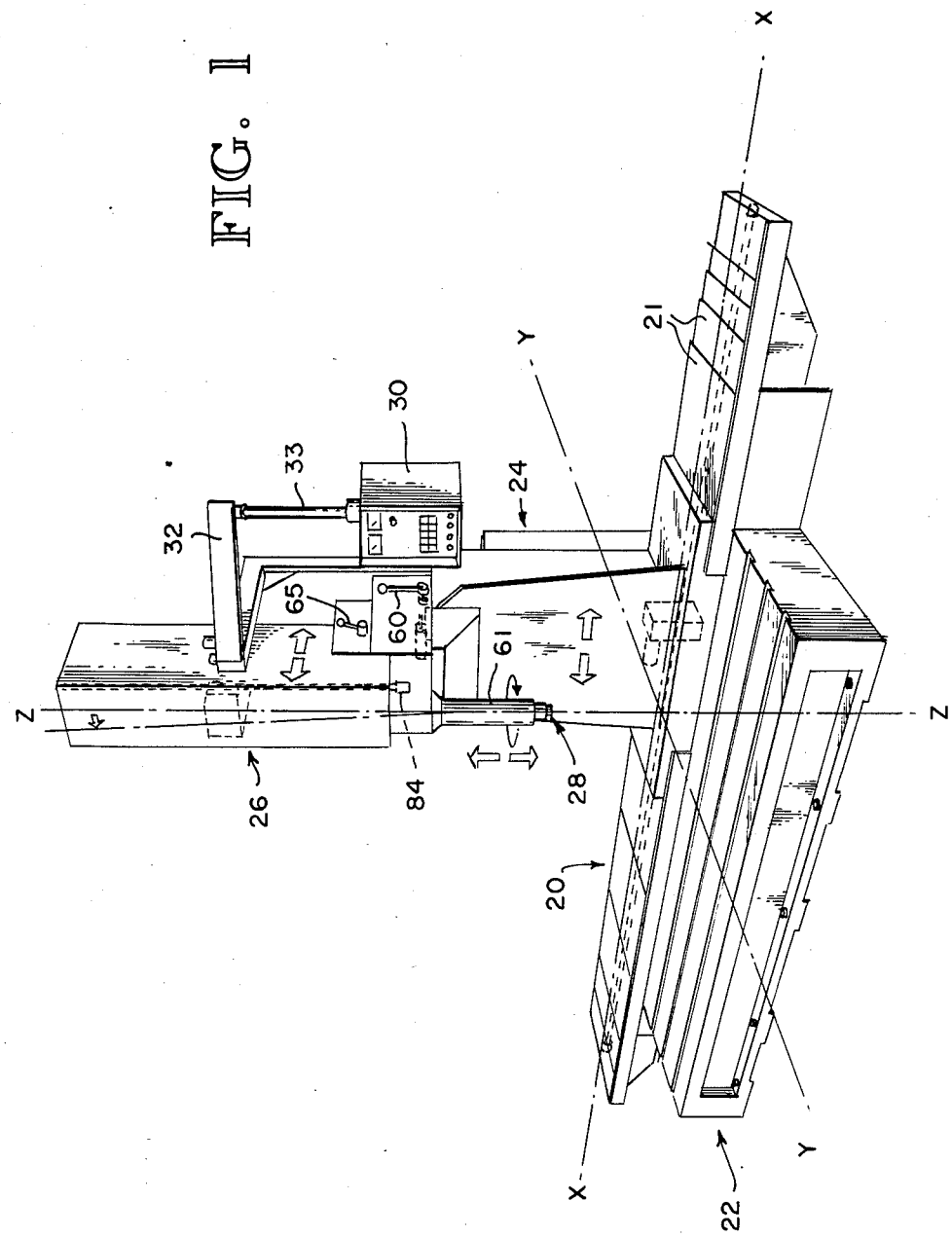
FIG. 1 is a perspective view of a machine embodying the present invention and showing the travel directions by arrows along three axes.

Referring to the drawings, it is seen that the combined surfacing and boring machine of the present invention has a rigid stationary elongated base 20 with telescopic cover plates 21, a rigid stationary work table 22 at the front for receiving an engine block to be worked, a traveling column or support unit 24 movable along ways on the base 20, and a position adjustable power head unit 26 seated on an upper support surface the column 24 and providing a powered vertically traveling spindle 28 overhanging the work table 22. A pendant control console 30 is swing-mounted on the power head unit by a swing arm 32 and can be rotated about the vertical axis of a hang rod 32a at the outer end of the swing arm so that the console can readily be positioned to be viewed from the front or back of the machine.

As indicated in FIG. 1, for purposes of this discussion the longitudinal axis of the bed 20 will be called the X-axis, the horizontal transverse axis (front and back) will be referred to as the Y-axis, and the vertical axis will be designated the Z-axis.

Three electric motors are provided: a constant torque D.C. servo motor 33 on the traveling column 24 to move it along a stationary ball-type screw 34 on the X-axis by way of a driven mating nut 34a; a constant speed A.C. motor 35 on the power head unit to rotate the spindle 28 via a speed change unit 36 and a vertical drive shaft 37; and a D.C. servo motor 38 driving a vertical ball-type screw 40 via a gear train 38a–e to feed a carrier 39 for the spindle along the Z-axis. A conventional air float system with a pattern of orifices in the base of the power head unit is provided to ease manual adjustment of the power head unit on the top surface of the column 24. This adjustment is aided by means of a rack and pinion 41, 42 operated manually. When the machine is being used for surfacing, the power head unit is tilted by a wedging system slightly to the left on the column 24 when viewed from the front. The tilted position is shown in FIG. 1 to an exaggerated extent by the Z'-axis.

Compressed air is supplied to the machine to air float the power head unit, to operate an air cylinder 43 in the wedging system for tilting the power head unit, to operate cylinders 44 at the lower end of the column 24 in a clamping system to fix the position of the column 24 on the X-axis, to operate a cylinder 45 in a quick change system for the tools, and to operate four cylinders 46 in a clamping system to fix the position of the power head unit 26 relative to the column 24. Suitable flexible hosed (not shown) are provided on the machine to conduct the compressed air from the supply to the air float orifices and the air cylinders 43–46. Preferably quick disconnect fittings are provided in a junction box 47 at the bottom of the power head unit 26 for the air supply hose thereto and for the various wires (not shown) from the column 24.

It will be noted that the housing 126 of the power head has a base portion 126a with a forwardly projecting boss 126b and has an upstanding mast portion 126c. The latter has a forwardly projecting crown piece 126d overlying the boss portion 126b. A generally channel shaped cover plate 126e extends between the crown piece 126d and the boss portion 126b. Extending vertically between journals in the crown piece 126d and the base portion 126a are the vertical drive shaft 37 for rotating the spindle 28, a centering finger adjusting shaft 83 for use when boring is to be performed, and the ball-type screw 40 for feeding the spindle 28. The spindle carrier 39 travels along the shafts 37, 83 and has a suitable ball-type nut 40a threaded onto the screw 40. In such a nut a series of balls ride in the helical grooves of the screw and recirculate through tubular passages in the nut housing. Turning of the screw 40 by the servo motor 38 causes the nut 40a together with the spindle carrier 39 to move along the screw 40 and thereby feed the spindle 28.

Figure 5:
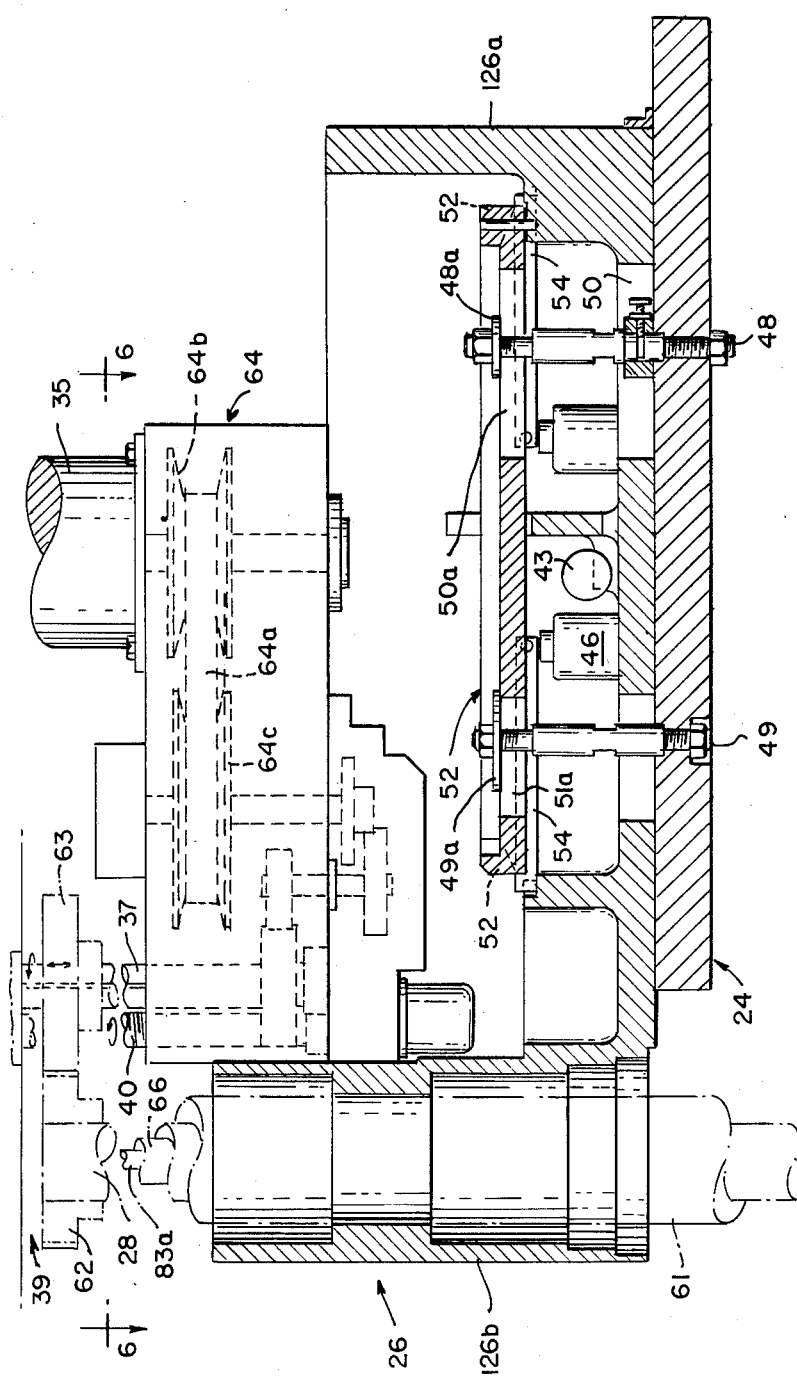
FIG. 5 is a fragmentary vertical sectional view along the Y-axis and with the bottom portion of the power head assembled.

Directing attention to FIGS. 2 and 5, the housings 124 and 126 of the column 24 and power head unit 26 have opposed, accurately machined top and bottom surfaces, respectively, so as to provide a rigid unitary structure when the column and power head unit are clamped together after adjustment of the power head unit. Horizontal movement of the power head unit on the column is restricted by two bolts 48, 49 aligned along the Y-axis which pass upwardly through the upper wall of the column housing 124 and through slots 50, 51 in the bottom wall of the power head housing 126 and slots 50a, 51a in a generally rectangular leveraging plate 52. The bolts 48, 49 have nuts at their opposite ends and have sleeved thereon respective washers 48a, 49a each having a diameter exceeding the width of the slots 50a, 51a in a generally rectangular leveraging plate 52 to restrict upward movement of the plate 52. This plate has four short arms 52a at its corners extending parallel to the X-axis and overlying respective levers 54.

The latter are pivotally mounted at their inner ends of the piston rods of the cylinders 46 and bear downwardly at their outer end portions on fulcrum ledges provided by the power head housing 126. The cylinders 46 seat on the bottom wall of the power head housing so that when they are supplied with compressed air their piston rods urge the inner ends of the levers 54 upwardly such that the levers 54 are forced to pivot around their points of contact with the underside of the arms 52a of the leveraging plate and pry downwardly on the power head housing 126. There is a substantial mechanical advantage for the cylinders 46 as their piston rods are extended so that the power head housing 126 is forced downwardly firmly against the top of the column housing 128. Only slight vertical movement of the power head unit is required, i.e., enough to permit an air float thereof.

It is preferred to be able to move the spindle 28 left or right of the Y-axis small distances without having to move the column 24 in order to perfectly center the spindle 28 with respect to an engine block cylinder preparatory to boring it. This is accomplished by permitting the entire power head unit 26 to be swung to a limited extent about the rear bolt 48 as a pivot while in an air float condition as well as being able to be shifted forwardly or rearwardly relative to both bolts 48, 49. To this end a slide block 56 is sleeved on the rear bolt 48 to fit within the slot 50. The front slot 51 in the bottom wall of the power head housing and the overlying slot 51a in the leveraging plate 52 are sufficiently wider than the diameter of the front bolt 49 to give the play necessary for the desired limited swinging ability of the power head unit 26 while in an air float condition.

Since the power head unit is relatively large and heavy, to assist in manually shifting it on the Y-axis during setup for an engine block different from that last worked, the rack and pinion 41, 42 are provided. As seen in FIG. 2, the rack 41 occupies a slot 58 in the bottom wall of the power head housing 26a and is bolted to the top of the column 24. The pinion 42 has its shaft journaled in a boss 59 and has a handle 60 at its outer end. Normally the pinion 40 is disengaged and occupies a position to the left of the rack. When the rack and pinion are to be used the handle 60 is pulled to the right in opposition to a return spring in the boss 59 to engage the pinion and is then pushed rearwardly when the power head unit is in an air float condition to responsively push the power head unit 26 forwardly on the column 24, or is pulled forwardly to shift the power head unit rearwardly.

Figure 7:
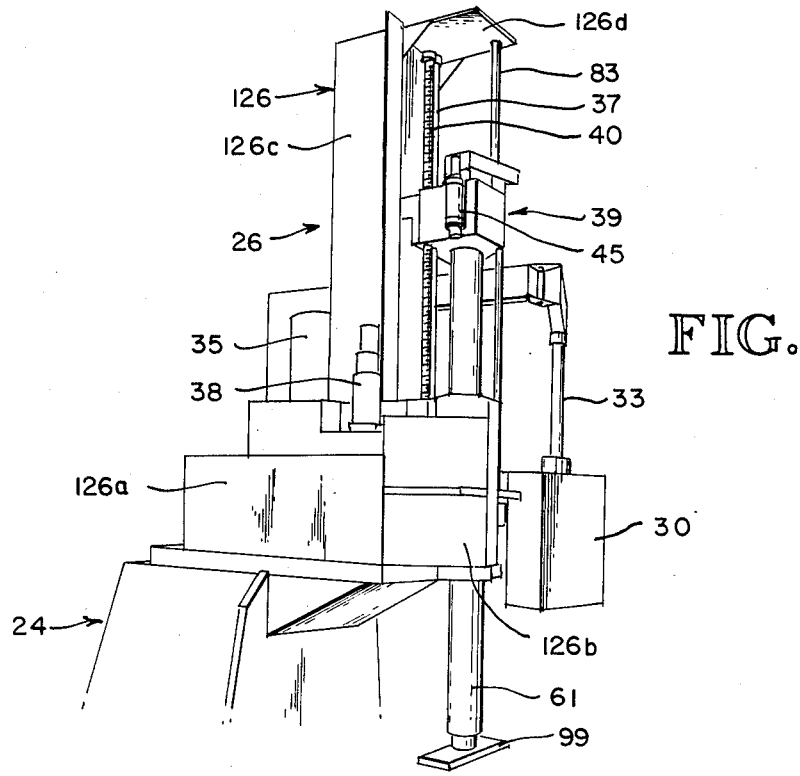
FIG. 7 is a perspective view of the power head unit of the machine as viewed from the left and with the front cover removed.

Directing attention to FIG. 7, a support tube 61 depends rigidly from a weld connection with the spindle carrier housing 139 and passes downwardly through two bearings in the boss 126b at the front of the base portion of the power head housing. The support tube 61 in turn provides bearing support for the spindle 28 which extends upwardly into the carrier 39 to receive a gear 62 driven by a sliding gear 63 confined by the carrier. This gear 63 has a key riding in a keyway along the drive shaft 37. As indicated in FIG. 5, the drive shaft 37 is powered at its lower end within the base portion 126a of the power head housing from a motor 35 through a variable speed drive unit 64 having overlapping high and low speed ranges set by operation of a handle 65. This unit may be of the type incorporating a tapered belt 64a driving between conical pulleys 64b, 64c, whose conical faces have a variable axial spread, or any other suitable variable speed device.

As part of a quick change mechanism for the tools, a draw tube 66 extends part way through the support tube 61 and is necked near its lower end. A spring 68 seated on a snap ring 69 set into an inner groove in the spindle 28 biases the draw tube 66 upwardly. At its lower end the draw tube 66 has a pair of radial locking ears 70 to fit into grooves beneath a complementing pair of inner lips 72 formed at the upper end of a tool adapter 74. These lips 72 are circumferentially spaced apart sufficiently for introduction of the ears 70 preparatory to interfitting the ears with the grooves by then turning the adapter 74 a quarter turn. While this interfit is being performed the air cylinder 45 operates on a lever 75 pivoted at a pivot pin 76 to force the draw tube 66 downwardly sufficiently for clearance adequate to permit insertion of the tool adapter.

The lower end of the spindle 28 has a tapered inner face 28a matched by a tapered upper face on a hub 74a at the lower end of the tool adapter 74. A drive key 77 projects upwardly from the adapter hub 74a to interfit with a mating recess 77a exposed at the bottom of the spindle 28 when the adapter 74 is in proper position. At its upper end the draw tube 66 is necked and formed with a keyway to interfit with a keying pin 78 projecting from a cap 79 on the spindle so that the draw tube and spindle remain with a fixed circumferential orientation relative to one another while permitting the necessary vertical movement of the draw tube relative to the spindle.

Hanging in the draw tube 66 and straddled near the top by forks 75a at the working end of the lever 75, is a centering finger drive shaft 83a connected at the top to a pinion 80. This pinion is connected by an idler 81 to a sliding gear 82 keyed to an adjusting shaft 83 which extends from the crown piece of the power head housing downwardly to an exposed knob 84 to be manually turned for extension and retraction of the centering fingers 85 in the boring tool head when such is used. The adjusting shaft 83 has a keyway along its length so that the gear 82 can ride along the adjusting shaft 83 as the spindle 28 moves up and down. The centering finger drive shaft 83a is internally splined at its lower end to interfit with splines at the upper end of a complementing centering finger drive shaft section 83b free to turn within the adapter 74 for the boring tool head and operate a bottom pinion meshing with a rack on the centering fingers 85 as is well known in the art and is indicated in FIG. 8A. It will be apparent that when the centering fingers in the boring head are in retracted position turning of the knob 84 in one direction will cause the fingers to extend, and turning in the opposite direction will rotate the boring tool at the lower end of the adapter 74.

As previously indicated a motor 33 on the traveling column 24 is used to drive the ball-type nut for a complementing stationary screw 34 to move the column and the power head unit 26 carried thereby along the X-axis to advance the spindle 28 along the head face of an engine block held stationary on the work table 22 by a suitable clamping device. The base 24 has a pair of precision ways of rails 86, 87 bolted in parallel horizontal position and the column 24 has teflon shoes 88, 88' riding thereon. At the front the column also has depending guide shoes 90, 91 straddling the front rail 86.

Figure 6:
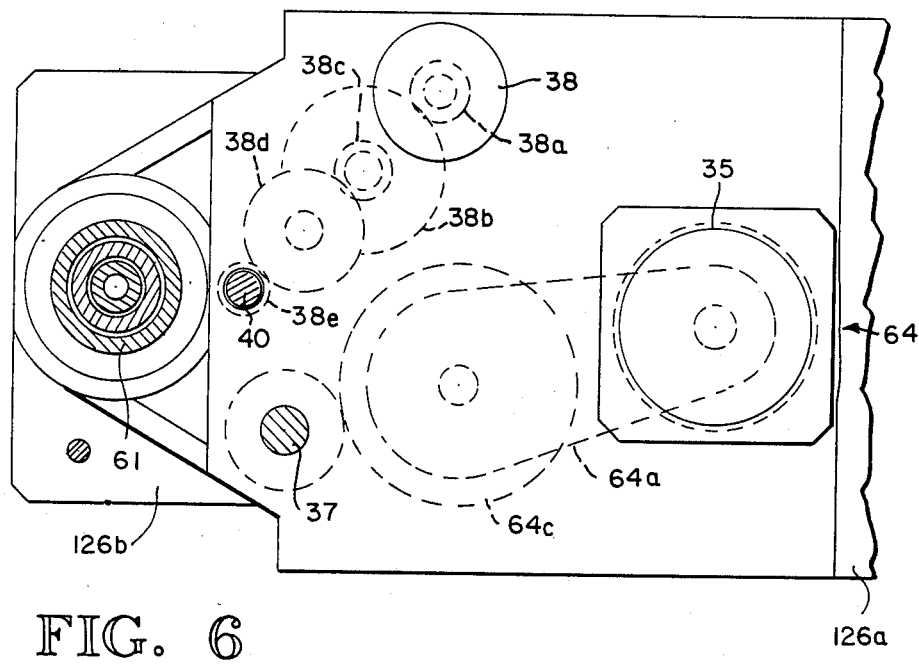
FIG. 6 is a horizontal sectional view taken as shown by line 6—6 in FIG. 5.

When the column 28 is in selected position along the X-axis it is preferred to clamp the column to the base 20. A suitable clamping system is shown in FIG. 6 for one side of the column and this may be duplicated on the other side. The clamping system is operated by supplying compressed air to the cylinder 44 which causes a pair of lever arms 92, 92' to swing in opposite directions about bottom pivots 93, 93'. This causes the lower edges of the lever arms to engage and push downwardly on pressure pins 94, 94' projecting upwardly from the inner half of respective crossheads 95, 95' each carried by a suspended rod 96. As indicated in FIG. 13, the rods 96 and their crossheads responsively rock and cause the outer half of the crossheads to bear on the underside of the rails 86, 87 and clamp the rails between the shoes 88, 88' and the crossheads 95, 95'. When air pressure is released to unclamp, return springs 98 urge the crossheads out of rail engagement.

When surfacing an engine block by the present machine it is preferred to use a fly cutter 99 with at least two arms for speed as shown in FIG. 7. So that only the cutting tool on the advancing arm of the fly cutter is engaging the work piece, it is preferred to tilt the spindle axis (Z-axis) slightly so that the plane of the fly cutter slopes downwardly in the direction of tool advance along the X-axis (to the left in FIGS. 1 and 14). Referring to FIGS. 2-4 it will be seen that at the right side, when viewed from the front of the machine, the underside of the power head housing 126 has a recess 104 to receive a wedging arm 100 pivoted at 101 at its forward end. The arm 100 has a drag pin 102 at its forward end extending upwardly through a slot 103 in the bottom wall of the power head housing to make connection with the piston rod 43a of double-acting cylinder 43. The upper face 104a of the recess 104 is sloped upwardly to the left so that as the rod 43a of cylinder 43 is retracted, the arm 100 is wedged against the sloped face 104a as indicated in FIG. 4, and tilts the power head unit 26 slightly to the left. This tilts the Z-axis as indicated an exaggerated amount by the Z'-axis in FIG. 1. As a consequence the adapter 74 for the fly cutter is likewise tilted.

When a boring tool is being used on the machine and has completed reboring of a cylinder it normally displaces very slightly to the left when it passes through the lower end of the cylinder bore. If the boring tool is then retracted without adjustment the tool will score the cylinder wall. To avoid this the tool tip should be aimed to the left and then moved sufficiently to the right along the X-axis to clear the cylinder wall when the tool is then retracted. The necessary tool tip movement to the right can be accomplished in either of two ways: (1) by moving the column 24 slightly to the right on the ways by use of the motor 33, or (2) by tilting the power head unit 26 in the manner previously described preliminary to use of the fly cutter. To aid in determining when the boring tool tip is aimed to the left, the knob 84 is preferably provided with an indicating mark arranged to conform circumferentially with the location of the boring tool tip.

In the foregoing discription the unit 24 has been called a "column". This term is not intended to indicate any particular height to unit 24. In some applications of the invention, for example, the unit 24 could be short. Basically the column 24 is a traveling support unit guided on a rigid base along a precision straight horizontal path.

We claim:
1. A power tool comprising:
    a rigid, elongated base unit defining a straight horizontal travel path, said base unit having a forward side and a rearward side located on opposite transverse sides of said travel path, a rigid work table fixed forwardly of said travel path to be stationary relative to said base unit for receiving a workpiece;

a traveling support unit engaging said base unit and guided and power driven for selective powered movement along said path, said support unit having an upper horizontal support surface spaced above said base unit;

a power head unit normally resting with its weight bearing against said support surface and having an output spindle with a vertical feed axis which is located forwardly of the travel path and support unit and depends over said work table so that the spindle is offset from the support unit in a forward direction which is transverse to said travel path, said power head unit being adapted to selectively receive a tool on said spindle and to be selectively moved bodily forwardly or rearwardly in a horizontal plane over said upper support surface so that said feed axis responsively moves in a plane which is transverse to said travel path; and clamping means for selectively clamping said power head unit downwardly against said support surface.

2. A power tool according to claim 1 in which tilting means are provided to selectively tilt said power head unit relative to said support surface such as to tilt the axis of the spindle from a vertical position to a tilted position in a vertical plane parallel to said travel path.

3. A power tool according to claim 2 in which said clamping means is anchored to said support unit and engages said power head unit for selectively clamping the power head unit downwardly against the support unit when said axis of the spindle is in either said tilted position or vertical position.

4. A power tool according to claim 1 in which said power head unit has a vertically movable spindle carrier from which the spindle is suspended, a draw tube in the spindle having its upper end exposed in said carrier, a spring in the spindle biasing the draw tube upwardly into a locking position, means on said carrier and engaging the top of said draw tube for selectively moving the draw tube downwardly in opposition to the spring to a release position, and a tool adaptor extending upward through the spindle and adapted to be detachable connected to the draw tube when the draw tube is in said release position and held against being disconnected when the draw tube is in said locked position, said tool adaptor being keyed to said spindle when locked by the draw tube.

5. A power tool according to claim 1 in which said power head unit has a housing with a bottom wall formed with aligned front and back elongated slots;

a generally rectangular leveraging plate spaced above said slots and having front and back elongated slots vertically aligned therewith;

front and back hold-down bolts projecting upwardly from said support surface and extending through said front slots and said back slots;

means on said bolts above the leveraging plate to vertically confine the leveraging plate, levers each bearing down at one of its ends on said housing and engaging the underside of said leveraging plate adjacent a respective corner thereof;

and pressure means for selectively urging the other end of said levers upwardly to clamp the power head unit onto said support surfaces.

6. A power tool according to claim 1 in which clamping means is also provided for selectively clamping said support unit to said base unit.

7. A boring and surfacing machine comprising:

a rigid, elongated base unit defining a straight horizontal travel path, said travel path having a forward side and a rearward side located on opposite transverse sides of said travel path;

a rigid work table fixed forwardly of said travel path to be stationary relative to said unit for receiving a workpiece;

a traveling support unit mounted on said base unit and guided and power driven for selective powered movement along said travel path and having an upper horizontal support surface spaced above said base unit;

a power head unit being adapted to selectively receive a boring tool and a surfacing tool, said power head unit having a rear portion normally resting on said support surface and being adapted to be selectively moved forwardly or rearwardly over said support surface transversely relative to said travel path, and said power head unit having an output spindle located forwardly of said travel path and support surface, said spindle depending over said work table and having a feed axis which is offset from said support surface in a forward direction which is transverse to said travel path;

tilting means for selectively tilting the entire power head unit from a vertical position in which said feed axis is vertical and in which normally a boring tool is to be operated by said power head unit, to a tilted position in which said feed axis is tilted from the vertical in a vertical plane parallel to said horizontal travel path and in which normally a surfacing tool is to be operated by said power head unit; and clamping means carried by said power head unit and cooperating with said support unit for selectively clamping said power head unit downwardly against said horizontal support surface when said power head unit is in a vertical position or a tilted position.

8. A boring and surfacing machine according to claim 7 in which said power head unit has a recessed sloped face on its underside directed downwardly and in the direction of said travel path, and said tilting means includes a swing arm pivotally mounted on said power head unit to oppose said sloped face and includes means on said power head unit for selectively swinging said swing arm into engagement with said sloped face to tilt the power head unit relative to said support surface.

9. A power tool comprising:

a rigid, elongated base unit defining a straight horizontal travel path, said base unit having a forward side and a rearward side located on opposite transverse sides of said travel path, a rigid work table fixed forwardly of said travel path to be stationary relative to said base unit for receiving a workpiece;

a traveling support unit on said base unit guided and power driven for selective powered movement along said path and having an upper horizontal support surface spaced above said base unit;

a power head unit having a housing with a bottom wall formed with aligned front and back elongated slots, said power head unit normally resting with its weight bearing against said support surface and having an output spindle with a vertical feed depending forwardly of the support unit over said work table, and said power head unit being adapted to receive a tool on said spindle and to be selectively moved bodily forwardly or rearwardly in a horizontal plane over said support surface transversely relative to said travel path;

a generally rectangular leveraging plate spaced above said slots in the bottom wall of the housing and having front and back elongated slots vertically registering therewith;

front and back hold-down bolts projecting upwardly from said support surface and extending through said registered front slots and back slots;

means on said bolts above the leveraging plate to vertically confine the leveraging plate;

levers each bearing down at one of its ends on said housing and engaging the underside of said leveraging plate adjacent a respective corner thereof;

said front slots being wide enough to permit limited movement of the power head unit relative to said front bolts in a direction generally parallel to said travel path, and said back slots being too narrow for any such movement; and pressure means for selectively urging the other end of said levers upwardly to clamp the power head unit onto said support surface.

10. A power tool comprising:

a rigid, elongated base unit defining a straight horizontal travel path, said base unit having a forward side and a rearward side located on opposite transverse sides of said travel path, a rigid work table fixed forwardly of said travel path to be stationary relative to said base unit for receiving a workpiece;

a traveling support unit on said base unit guided and power driven for selective powered movement along said path and having an upper horizontal support surface spaced above said base unit;

a power head normally resting with its weight bearing against said support surface and having an output spindle with a vertical feed depending forwardly of the support unit over said work table, and said power head unit being adapted to receive a tool and to be selectively moved bodily forwardly or rearwardly in a horizontal plane over said support surface transversely relative to said travel path; and clamping means for selectively clamping said power head unit downwardly against said support surface, said clamping means being guided by and anchored to said support unit and being movable relative to said support unit parallel to said travel path, and said clamping means permitting the forward end of said power head unit to be horizontally adjusted in position generally parallel to said travel path relative to the position of the rear end of said power head while said clamping means is released.

* * * * *